United States Patent
Narasimha (10) Patent No.: US 9,794,599 B2
(45) Date of Patent: Oct. 17, 2017

(54) METHOD AND SYSTEM FOR AUDITING MULTIMEDIA CONTENT

(71) Applicant: TELIBRAHMA CONVERGENT COMMUNICATIONS PRIVATE LIMITED, Bangalore (IN)

(72) Inventor: Suresh Narasimha, Bangalore (IN)

(73) Assignee: TELIBRAHMA CONVERGENT COMMUNICATIONS PRIVATE LIMITED, Bangalore (IN)

(*) Notice: Subject to any disclaimer, the term of this patent is extended or adjusted under 35 U.S.C. 154(b) by 0 days.

(21) Appl. No.: 14/682,069

(22) Filed: Apr. 8, 2015

(65) Prior Publication Data

US 2015/0296229 A1    Oct. 15, 2015

(51) Int. Cl.
| | |
|---|---|
| H04H 60/32 | (2008.01) |
| H04N 21/234 | (2011.01) |
| H04L 29/06 | (2006.01) |
| H04L 12/26 | (2006.01) |
| H04N 21/24 | (2011.01) |
| H04N 21/2665 | (2011.01) |
| H04N 21/4722 | (2011.01) |
| G06Q 30/02 | (2012.01) |

(52) U.S. Cl.
CPC ... *H04N 21/23418* (2013.01); *G06Q 30/0241* (2013.01); *H04L 43/062* (2013.01); *H04L 65/4084* (2013.01); *H04N 21/2407* (2013.01); *H04N 21/2665* (2013.01); *H04N 21/4722* (2013.01)

(58) Field of Classification Search
CPC .. G06K 9/46; H04N 21/4126; H04N 21/4227; H04N 21/2543; H04N 21/4147; H04N 21/435; H04N 21/26603; H04N 21/2665; H04N 21/4345; H04N 21/44008; H04N 21/44204; H04N 21/4722; H04N 21/44222; H04N 21/80; H04N 21/8133; H04N 21/83; H04N 21/84; H04H 60/59
See application file for complete search history.

(56) References Cited

U.S. PATENT DOCUMENTS

| | | | |
|---|---|---|---|
| 5,684,918 A * | 11/1997 | Abecassis | A63F 13/10 348/14.01 |
| 6,504,990 B1 * | 1/2003 | Abecassis | G11B 19/02 348/E5.105 |
| 7,237,252 B2 * | 6/2007 | Billmaier | G06F 1/3203 348/E5.006 |
| 8,689,255 B1 * | 4/2014 | Gregov | H04N 21/4722 725/14 |

(Continued)

*Primary Examiner* — Pankaj Kumar
*Assistant Examiner* — Timothy Newlin
(74) *Attorney, Agent, or Firm* — Barry Choobin Patent 360 LLC (57) ABSTRACT

The embodiments herein provide a system and method for auditing a plurality of multimedia content, creating a contextual cycle of multimedia contents, and associating the plurality of the multimedia content with a source. The system comprises a plurality of multimedia input sources configured for receiving a plurality of multimedia content, an analysis and recognition module connected to the plurality of multimedia input sources and configured for analyzing and recognizing the plurality of the received multimedia contents, and an auditing console communicatively coupled with the analysis and recognition module.

17 Claims, 3 Drawing Sheets

(56) References Cited

U.S. PATENT DOCUMENTS

| | | | |
|---|---|---|---|
| 9,253,533 B1* | 2/2016 | Morgan | H04N 21/44008 |
| 2001/0021916 A1* | 9/2001 | Takai | G06Q 30/0257 |
| | | | 725/60 |
| 2001/0052133 A1* | 12/2001 | Pack | G06Q 30/02 |
| | | | 725/109 |
| 2002/0056091 A1* | 5/2002 | Bala | G06Q 30/02 |
| | | | 725/34 |
| 2002/0120934 A1* | 8/2002 | Abrahams | G06Q 30/06 |
| | | | 725/60 |
| 2003/0093790 A1* | 5/2003 | Logan | G06F 17/30265 |
| | | | 725/38 |
| 2003/0182658 A1* | 9/2003 | Alexander | G06Q 30/0633 |
| | | | 725/60 |
| 2005/0005308 A1* | 1/2005 | Logan | G06Q 30/06 |
| | | | 725/135 |
| 2006/0150218 A1* | 7/2006 | Lazar | G06Q 30/02 |
| | | | 725/60 |
| 2007/0050832 A1* | 3/2007 | Wright | H04H 60/27 |
| | | | 725/115 |
| 2008/0098425 A1* | 4/2008 | Welch | H04N 5/44513 |
| | | | 725/37 |
| 2008/0255961 A1* | 10/2008 | Livesey | G06Q 30/02 |
| | | | 705/26.8 |
| 2009/0077459 A1* | 3/2009 | Morris | H04N 5/44508 |
| | | | 715/201 |
| 2010/0175080 A1* | 7/2010 | Yuen | G09F 27/00 |
| | | | 725/32 |
| 2011/0167456 A1* | 7/2011 | Kokenos | G06Q 30/02 |
| | | | 725/60 |
| 2012/0033876 A1* | 2/2012 | Momeyer | G06F 17/30781 |
| | | | 382/165 |
| 2012/0227073 A1* | 9/2012 | Hosein | H04N 21/4126 |
| | | | 725/60 |
| 2013/0170753 A1* | 7/2013 | Tanaka | G06F 17/30256 |
| | | | 382/190 |
| 2014/0082655 A1* | 3/2014 | Moon | H04N 21/462 |
| | | | 725/27 |
| 2014/0115060 A1* | 4/2014 | Kim | H04L 65/4076 |
| | | | 709/204 |
| 2015/0296229 A1* | 10/2015 | Narasimha | H04N 21/23418 |
| | | | 725/9 |

* cited by examiner

METHOD AND SYSTEM FOR AUDITING MULTIMEDIA CONTENT

CROSS REFERENCE TO RELATED APPLICATIONS

The patent application claims the priority of Indian Provisional Patent Application with no. 1881/CHE/2014 filed on Apr. 10, 2014, with the title, "Method And System For Auditing Multimedia Digital Assets, Creating a Contextual Cycle of the Multimedia Assets and Associating Multimedia Digital Assets with a Source", and the contents of which is incorporated in entirety by reference herein.

BACKGROUND

Technical Field

The embodiments herein is generally related to the data processing systems and methods and particularly related to a method for providing the interactive services for the multimedia contents. The embodiments herein is more particularly related to a method and system for providing auditing solutions for the multimedia contents, creating a contextual cycle queue of the multimedia contents, and determining a source of the multimedia content.

Description of the Related Art

Content delivery networks, such as cable, satellite, Internet, have been developed to deliver various multimedia content from a remote source to a user's equipment for viewing or interaction. The multimedia contents are delivered using a plurality of methods. The delivery methods include but are not limited to live broadcast programs, web casts, Pay-per-View (PPV) events, and/or VOD content. Sometimes, a user may select one or more multimedia content for recording locally on the user's equipment, such as a VCR or digital video recorder (DVR). A live broadcast is typically viewed and/or recorded at the scheduled time set by the broadcast station, whereas VOD content is viewed and recorded at any user-specified time prior to the expiration time of the VOD content. PPV programs also have expiration dates and are viewed and/or recorded before the expiration times/dates of the asset from the source server.

The status of multimedia content may change from time to time. For example, broadcast programs may migrate to VOD or web casts, or PPV content may migrate to VOD. For example, the channel HBO may remove a multimedia content from their regular scheduled broadcast lineup, but continue to make the multimedia content available on VOD for an additional amount of time. Another status change may be a change in the expiration time/date of the multimedia content. Expiration date/time for the multimedia content is typically listed in an interactive multimedia guidance application, such as an interactive program guide (IPG). The user may not always be aware of a status change that may prevent the user from viewing and/or recording the multimedia content.

Further, a log of the contents is generated to indicate the contents being played, time of play of a particular media, the program that is played frequently or most often, and other similar parameters, when an advertisement, a song clip or any related media is played using a channel. However, the currently available methods do not provide any automated systems to provide these third party information or the existing methods require a manual intervention to generate such a report. Thus, an advertiser or a media owner of the multimedia content is not able to get the exact statistical report and thus are unable to target multimedia content to the intended users/consumers.

Further, in most of the recent television and mobile engagement methods or integrations, the users are not able to engage with the desired advertisements at the right time, such as capturing the multimedia content from the television through a mobile phone camera. A common problem in capturing the television content is that the advertisement being played mostly gets over and another advertisement or program starts by the time, when a user takes out his mobile device and starts an application for capturing the advertisement. In order to engage with these multimedia contents, there is time lag between the time of starting an application on the mobile device and the time of capturing the displayed content by the user. Similarly, when a user comes across an advertisement on a hoarding in an outdoor environment, the user fails to understand or note down the advertisement content and related information as the vehicle move past the hoarding quickly.

Moreover, the conventional systems, however, lack an integrated approach to monitor the status of a multimedia content and to timely notify users of a status change that may influence them. In addition, the currently available methods do not provide an identification of the channel/source from which the advertisement or the multimedia content is captured by the user.

Hence, there is a need for a method and a system for enabling the user to engage with a multimedia content displayed on a displaying unit in real time. Also there is a need for a method and system for providing an auditing solution for the multimedia content being played on a plurality of channels. Further, there is a need for a method and system for recognizing the source of the multimedia content being displayed in a displaying unit.

The above mentioned shortcomings, disadvantages and problems are addressed herein and which will be understood by reading and studying the following specification.

OBJECTIVES OF THE EMBODIMENTS

The primary object of the embodiments herein is to provide a method and system for auditing and creating a report for a plurality of multimedia content displayed on a plurality of channels.

Another object of the embodiments herein is to provide a method and system for creating a contextual cycle for the plurality of multimedia content displayed on indoor and outdoor environments.

Yet another object of the embodiments herein is to provide a method and system to display the history of the contexts within a given environment on user initiating the engagement.

Yet another object of the embodiments herein is to provide a method and system for determining a source of the multimedia media content displayed on a channel.

Yet another object of the embodiments herein is to provide a method and system for interacting with the multimedia content through a mobile device on a real time basis.

Yet another object of the embodiments herein is to provide one or more related information about the recognized multimedia content to a plurality of users.

These and other objects and advantages of the embodiments herein will become readily apparent from the following detailed description taken in conjunction with the accompanying drawings.

SUMMARY

The various embodiments herein provide a system for auditing a plurality of multimedia content, creating a contextual cycle of multimedia contents, and associating the plurality of the multimedia content with a source. The system comprises a plurality of multimedia input sources configured for receiving a plurality of multimedia content, an analysis and recognition module connected to the plurality of multimedia input sources and configured for analyzing and recognizing the plurality of the received multimedia contents, and an auditing console communicatively coupled with the analysis and recognition module.

According to an embodiment herein, the plurality of the multimedia input sources include a plurality of streamed multimedia content sources and a plurality of non-streaming or stored multimedia content sources. According to an embodiment of the present invention, the plurality of streamed multimedia content sources include internet, cable and satellite, and the plurality of non-streaming or stored multimedia content sources include hard disk and webcasts.

According to an embodiment herein, the analysis and recognition module comprises a stream analyzer, a multimedia recognition unit, a context queue database and a pattern database. According to an embodiment of the present invention, the stream analyzer is configured to directly processes and continuously sample the plurality of multimedia contents received from the plurality of multimedia input sources for building a contextual queue of the plurality of the multimedia content received from the plurality of multimedia input sources in the context queue database.

According to an embodiment herein, the multimedia recognition unit is configured for processing and recognizing a plurality of received multimedia contents captured by a plurality of mobile devices. According to an embodiment of the present invention, pattern database is configured for storing a plurality of patterns related to the plurality of the received multimedia contents, and the plurality of patterns include a specific clip of the multimedia content, a marker associated with the clip, and a hidden marker associated with the clip.

According to an embodiment herein, the auditing console is configured for monitoring the pattern database to generate an audit report.

According to an embodiment herein, the plurality of mobile devices is connected to a plurality of channels and the plurality of mobile devices is loaded with a client application to enable the user to interact with a real time multimedia digital assets displayed on the channel to capture the plurality of multimedia contents and to engage with the plurality of multimedia content in real time. According to an embodiment of the present invention, the plurality of the mobile devices is selected from a group consisting of mobile phones, smartphones, tablet computes, laptop computers, internet connectable devices, personal digital assistants (PDAs), and wearable devices.

According to an embodiment herein, the plurality of channels is configured for displaying the plurality of the multimedia content through the mobile device.

According to an embodiment herein, the plurality of channels is selected from a group consisting of a Television, Digital signage, hoardings, and a multimedia content is displayed to a plurality of users.

According to an embodiment herein, the auditing console is configured to provide auditing solutions by processing and storing a log of the plurality of multimedia contents received from the plurality of multimedia input sources.

According to an embodiment herein, the multimedia recognition unit is configured to fetch an input from the plurality of users. According to an embodiment of the present invention, the multimedia recognition unit is connected with the stream analyzer to provide a required information to the plurality of users.

According to an embodiment herein, the auditing console is configured to monitor a plurality of patterns based on the patterns stored in the pattern database to generate the audit report for enabling a plurality of media agencies to distribute a respective multimedia content across a plurality of channels.

According to an embodiment herein, the client application installed in the mobile device enables the plurality of users to recognize a channel in which the multimedia content is displayed.

According to an embodiment herein, the stream analyzer is configured to provide a related information to the plurality of users. According to an embodiment of the present invention, the related information include a next sequence of the multimedia content, a previous sequence of the multimedia content, a user rating of the multimedia content, a popularity of the multimedia content, show timings of the multimedia content, and a location of the origin of the multimedia content.

According to an embodiment herein, the analysis and recognition module customizes the plurality of multimedia contents delivered to the plurality of mobile devices based on the generated audit report.

The various embodiments herein provide a method for auditing multimedia digital assets, creating a contextual cycle of the multimedia assets and associating multimedia digital assets with a source corresponding to software program code files. The method comprises connecting a plurality of multimedia input sources to an analysis and recognizing module, connecting an analysis and recognition module to the plurality of multimedia input sources for analyzing and recognizing the plurality of the received multimedia contents, directly processing and sampling the plurality of multimedia contents received from the plurality of multimedia input sources continuously with a stream analyzer in the analysis and recognition module, building a contextual queue of the plurality of the multimedia content received from the plurality of multimedia input sources in a context queue database with the stream analyzer, processing and recognizing a plurality of received multimedia contents captured by a plurality of mobile devices with a multimedia recognition unit in the analysis and recognition module, storing a plurality of patterns related to the plurality of the received multimedia contents in a pattern database, and communicatively coupling an auditing console with the analysis and recognition module for monitoring the pattern database to generate an audit report.

According to an embodiment herein, the plurality of the multimedia input sources include a plurality of streamed multimedia content sources and a plurality of non-streaming or stored multimedia content sources. According to an embodiment of the present invention, the plurality of streamed multimedia content sources include internet, cable and satellite, and the plurality of non-streaming or stored multimedia content sources include hard disk and webcasts.

According to an embodiment herein, the plurality of patterns include a specific clip of the multimedia content, a marker associated with the clip, and a hidden marker associated with the clip.

According to an embodiment herein, the method further comprises connecting the plurality of mobile devices to a plurality of channels and loading the plurality of mobile devices with a client application to enable a user to interact with a real time multimedia digital assets displayed on the channel to capture the plurality of multimedia contents and to engage with the plurality of multimedia content in real time. According to an embodiment of the present invention, the plurality of the mobile devices is selected from a group consisting of mobile phones, smartphones, tablet computes, laptop computers, internet connectable devices, personal digital assistants (PDAs), and wearable devices.

According to an embodiment herein, the method further comprises connecting the plurality of channels to the plurality of mobile devices for displaying the plurality of the multimedia content through the plurality of mobile devices. According to an embodiment of the present invention, the plurality of channels is selected from a group consisting of a Television, Digital signage, hoardings, and the multimedia content is displayed to a plurality of users.

According to an embodiment herein, the method further comprises processing and storing a log of the plurality of multimedia contents received from the plurality of multimedia input sources by the auditing console to provide auditing solutions.

According to an embodiment herein, the method further comprises fetching an input from the plurality of users through the multimedia recognition unit. According to an embodiment of the present invention, the multimedia recognition unit is connected with the stream analyzer to provide a required information to the plurality of users.

According to an embodiment herein, the method further comprises monitoring a plurality of patterns based on the patterns stored in the pattern database with the auditing console to generate the audit report for enabling a plurality of media agencies to distribute a respective multimedia content across a plurality of channels.

According to an embodiment herein, the method further comprises recognizing a channel, in which the multimedia content is displayed, with the client application installed in the mobile device.

According to an embodiment herein, the plurality of the multimedia content is selected from a group consisting of audio, video, animation, image, text, and a combination thereof.

According to an embodiment herein, the method further comprises creating a contextual queue for providing a related information about the recognized multimedia content. According to an embodiment of the present invention, the related information include an index of the multimedia content, a previous sequence, next sequence, and location information.

According to an embodiment herein, the method further comprises displaying the created contextual queue to the plurality of users through the plurality of mobile devices and customizing the plurality of multimedia content delivered to the plurality of mobile devices based on the generated audit report.

According to an embodiment herein, the method further comprises providing related information to the plurality of users by using a stream analyzer. According to an embodiment of the present invention, the related information include a next sequence of the multimedia content, a previous sequence of the multimedia content, a user rating of the multimedia content, a popularity of the multimedia content, show timings of the multimedia content, and location of the origin of the multimedia content.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for auditing a plurality of multimedia content, creating a contextual cycle of multimedia contents, and associating the plurality of the multimedia content with a source. The system comprises a plurality of multimedia input sources configured for receiving a plurality of multimedia content, an analysis and recognition module connected to the plurality of multimedia input sources and configured for analyzing and recognizing the plurality of the received multimedia contents, and an auditing console communicatively coupled with the analysis and recognition module.

According to an embodiment herein, the plurality of the multimedia input sources include a plurality of streamed multimedia content sources and a plurality of non-streaming or stored multimedia content sources. According to an embodiment herein, the plurality of streamed multimedia content sources include internet, cable and satellite, and the plurality of non-streaming or stored multimedia content sources include hard disk and webcasts.

According to an embodiment herein, the analysis and recognition module comprises a stream analyzer, a multimedia recognition unit, a context queue database and a pattern database. According to an embodiment herein, the stream analyzer is configured to directly processes and continuously sample the plurality of multimedia contents received from the plurality of multimedia input sources for building a contextual queue of the plurality of the multimedia content received from the plurality of multimedia input sources in the context queue database.

According to an embodiment herein, the multimedia recognition unit is configured for processing and recognizing a plurality of received, multimedia contents captured by a plurality of mobile devices. According to an embodiment herein, pattern database is configured for storing a plurality of patterns related to the plurality of the received multimedia contents, and the plurality of patterns include a specific clip of the multimedia content, a marker associated with the clip, and a hidden marker associated with the clip.

According to an embodiment herein, the auditing console is configured for monitoring the pattern database to generate an audit report.

According to an embodiment herein, the plurality of mobile devices is connected to a plurality of channels and the plurality of mobile devices is loaded with a client application to enable the user to interact with a real time multimedia digital assets displayed on the channel to capture the plurality of multimedia contents and to engage with the plurality of multimedia content in real time. According to an embodiment herein, the plurality of the mobile devices is selected from a group consisting of mobile phones, smartphones, tablet computes, laptop computers, internet connectable devices, personal digital assistants (PDAs), and wearable devices.

According to an embodiment herein, the plurality of channels is configured for displaying the plurality of the multimedia content through the mobile device.

According to an embodiment herein, the plurality of channels is selected from a group consisting of a Television, Digital signage, hoardings, and a multimedia content is displayed to a plurality of users.

According to an embodiment herein, the auditing console is configured to provide auditing solutions by processing and storing a log of the plurality of multimedia contents received from the plurality of multimedia input sources.

According to an embodiment herein, the multimedia recognition unit is configured to fetch an input from the plurality of users. According to an embodiment herein, the multimedia recognition unit is connected with the stream analyzer to provide a required information to the plurality of users.

According to an embodiment herein, the auditing console is configured to monitor a plurality of patterns based on the patterns stored in the pattern database to generate the audit report for enabling a plurality of media agencies to distribute a respective multimedia content across a plurality of channels.

According to an embodiment herein, the client application installed in the mobile device enables the plurality of users to recognize a channel in which the multimedia content is displayed.

According to an embodiment herein, the stream analyzer is configured to provide a related information to the plurality of users. According to an embodiment herein, the related information include a next sequence of the multimedia content, a previous sequence of the multimedia content, a user rating of the multimedia content, a popularity of the multimedia content, show timings of the multimedia content, and a location of the origin of the multimedia content.

According to an embodiment herein, the analysis and recognition module customizes the plurality of multimedia contents delivered to the plurality of mobile devices based on the generated audit report.

The various embodiments herein, provide a method for auditing multimedia digital assets, creating a contextual cycle of the multimedia assets and associating multimedia digital assets with a source corresponding to software program code files. The method comprises connecting a plurality of multimedia input sources to an analysis and recognizing module, connecting an analysis and recognition module to the plurality of multimedia input sources for analyzing and recognizing the plurality of the received multimedia contents, directly processing and sampling the plurality of multimedia contents received from the plurality of multimedia input sources continuously with a stream analyzer in the analysis and recognition module, building a contextual queue of the plurality of the multimedia content received from the plurality of multimedia input sources in a context queue database with the stream analyzer, processing and recognizing a plurality of received multimedia contents captured by a plurality of mobile devices with a multimedia recognition unit in the analysis and recognition module, storing a plurality of patterns related to the plurality of the received multimedia contents in a pattern database, and communicatively coupling an auditing console with the analysis and recognition module for monitoring the pattern database to generate an audit report.

According to an embodiment herein, the plurality of the multimedia input sources include a plurality of streamed multimedia content sources and a plurality of non-streaming or stored multimedia content sources. According to an embodiment herein, the plurality of streamed multimedia content sources include internet, cable and satellite, and the plurality of non-streaming or stored multimedia content sources include hard disk and webcasts.

According to an embodiment herein, the plurality of patterns include a specific clip of the multimedia content, a marker associated with the clip, and a hidden marker associated with the clip.

According to an embodiment herein, the method further comprises connecting the plurality of mobile devices to a plurality of channels and loading the plurality of mobile devices with a client application to enable a user to interact with a real time multimedia digital assets displayed on the channel to capture the plurality of multimedia contents and to engage with the plurality of multimedia content in real time. According to an embodiment herein, the plurality of the mobile devices is selected from a group consisting of mobile phones, smartphones, tablet computes, laptop computers, internet connectable devices, personal digital assistants (PDAs), and wearable devices.

According to an embodiment herein, the method further comprises connecting the plurality of channels to the plurality of mobile devices for displaying the plurality of the multimedia content through the plurality of mobile devices. According to an embodiment herein, the plurality of channels is selected from a group consisting of a Television, Digital signage, hoardings, and the multimedia content is displayed to plurality of users.

According to an embodiment herein, the method further comprises processing and storing a log of the plurality of multimedia contents received from the plurality of multimedia input sources by the auditing console to provide auditing solutions.

According to an embodiment herein, the method further comprises fetching an input from the plurality of users through the multimedia recognition unit. According to an embodiment herein, the multimedia recognition unit is connected with the stream analyzer to provide a required information to the plurality of users.

According to an embodiment herein, the method further comprises monitoring a plurality of patterns based on the patterns stored in the pattern database with the auditing console to generate the audit report for enabling a plurality of media agencies to distribute a respective multimedia content across a plurality of channels.

According to an embodiment herein, the method further comprises recognizing a channel, in which the multimedia content is displayed, with the client application installed in the mobile device.

According to an embodiment herein, the plurality of the multimedia content is selected from a group consisting of audio, video, animation, image, text, and a combination thereof.

According to an embodiment herein, the method further comprises creating a contextual queue for providing a related information about the recognized multimedia content. According to an embodiment of the present invention, the related information include an index of the multimedia content, a previous sequence, next sequence, and location information.

According to an embodiment herein, the method further comprises displaying the created contextual queue to the plurality of users through the plurality of mobile devices and customizing the plurality of multimedia content delivered to the plurality of mobile devices based on the generated audit report.

According to an embodiment herein, the method further comprises providing related information to the plurality of users by using a stream analyzer. According to an embodiment of the present invention, the related information include a next sequence of the multimedia content, a previous sequence of the multimedia content, a user rating of the multimedia content, a popularity of the multimedia content, show timings of the multimedia content, and location of the origin of the multimedia content.

Figure 1:
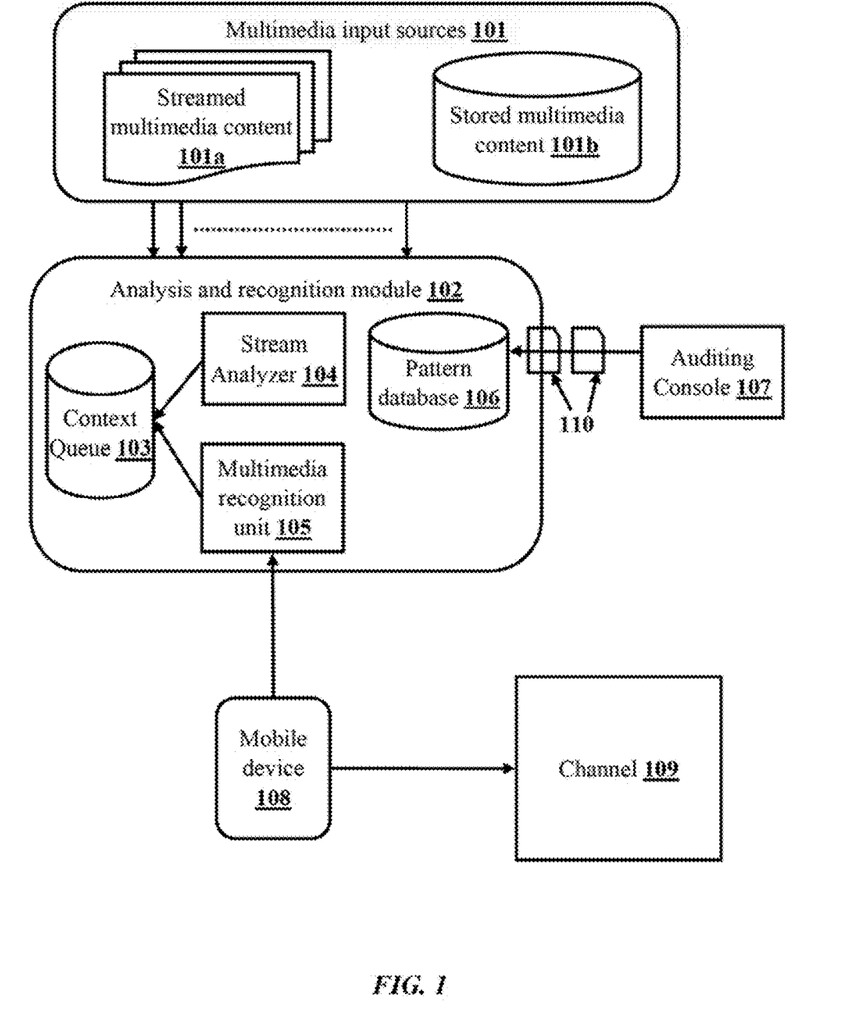
FIG. 1 illustrates a block diagram of a system far auditing a plurality of multimedia content, according to an embodiment herein.

FIG. 1 illustrates a block diagram illustrating a system for auditing a plurality of multimedia content, according to an embodiment herein. The system comprises the analysis and recognition module 102, which comprises the stream analyzer 104, the multimedia recognition unit 105, the context queue database 103, and the pattern database 106. Further, the system comprises the auditing and monitoring console 107 and the mobile device 108 installed with a client application.

According to an embodiment herein, the stream analyzer 104 directly processes and continuously samples the plurality of multimedia content received from the plurality of multimedia input sources 101. The plurality of multimedia input sources 101 comprises various streamed multimedia sources 101a and non-streamed or stored 101b multimedia sources. Examples of the streamed multimedia sources 101a include but are not limited to internet, cable satellite, and the like. Examples of the non-streamed or stored multimedia content 101b include but are not limited to hard disks, webcasts, and the like.

According to an embodiment herein, the multimedia recognition unit 105 processes and recognizes the multimedia content captured by the user through the client application in the mobile device 108. According to an embodiment herein, the examples of mobile device 108 include but are not limited to mobile phone, smart phone, laptop computers, personal computers, personal digital assistants (PDAs), wearable devices, and the like. Further, the context queue database 103 stores the list of multimedia content received from each of the multimedia input source 101. Example: for each television channel, the entire telecasted multimedia content are sampled and stored as a list in the context queue database 103.

According to an embodiment herein, the auditing console 107 provides auditing solutions by processing and storing a log of a plurality of multimedia content received from the plurality of multimedia input sources 101. Examples of the channel 109 include but are not limited to a television, digital signage, hoardings, and the like, where a multimedia content is broadcasted to the plurality of users.

According to an embodiment herein, the stream analyzer 104 assists in building a queue of the plurality of multimedia content received from the multimedia input streams. The multimedia recognition unit 105 assists in fetching an input from the user via the mobile device 108. According to an embodiment herein, the multimedia recognition unit 105 further connects with the stream analyzer 104 and provides the required information and additional information to the user. According to an embodiment herein, the client application installed in a mobile device 108 enables the users to interact with the real time multimedia content displayed on the channel 109.

According to an embodiment herein, the pattern database 106 comprises a plurality of patterns such as a specific clip, a marker associated with the clip, a hidden marker and other similar parameters. Further, the auditing console 107 monitors the patterns 110 with the help of the pattern database 106 and generates an audit report. According to an embodiment herein, the audit report is used by a plurality of media agencies for a proper distribution of respective multimedia contents across the plurality of channels 109.

According to an embodiment herein, the client application installed in the mobile device 108 also enables the user to capture a real time multimedia content and recognize the channel in which the multimedia content is displayed.

Figure 2:
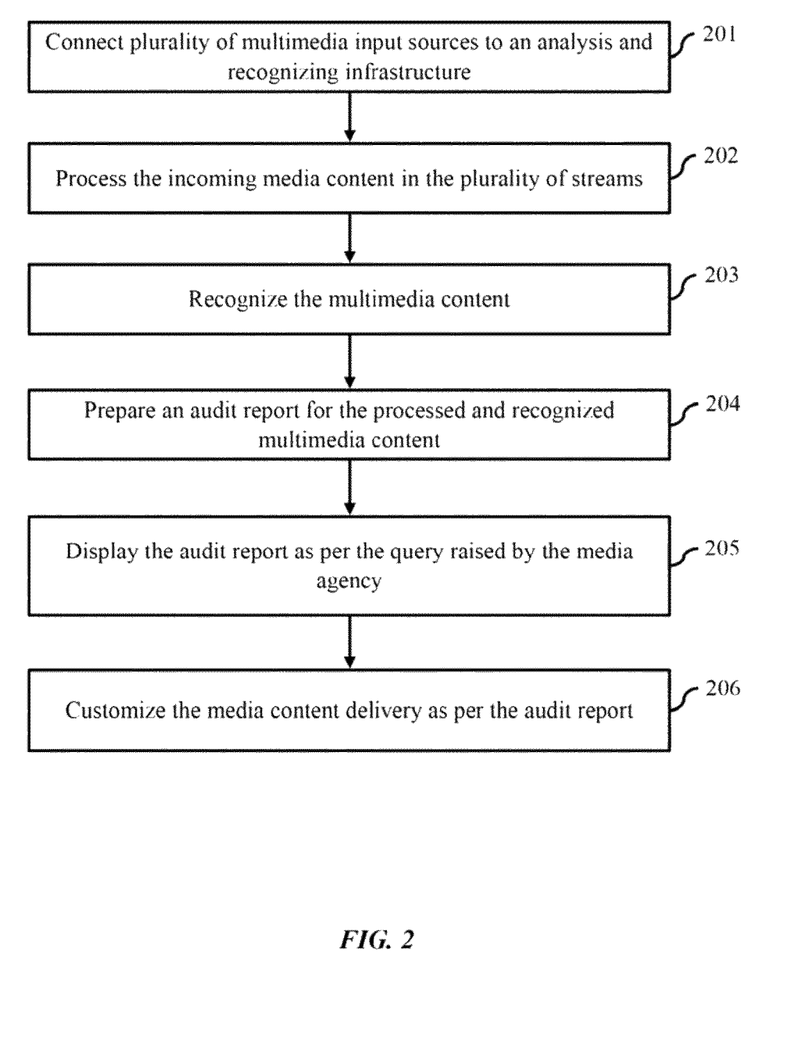
FIG. 2 illustrates a flow chart indicating a process for auditing and creating an audit report for one or more media agencies, according to an embodiment herein.

FIG. 2 illustrates a flow diagram illustrating a process for auditing and creating an audit report for one or more media agencies, according to an embodiment herein. The method comprises deploying an auditing console along with an analysis and recognizing module and connecting the auditing console to the channel (Step 201). According to an embodiment herein, the channel is any one of a television, a digital signage, digital hoardings, and the like. According to an embodiment herein, the plurality of multimedia input streams are connected to the analysis and recognizing module. The analysis and recognizing module further comprises a stream analyzer, a multimedia recognition unit and a pattern database. According to an embodiment herein, the stream analyzer continuously processes the incoming multimedia content from the plurality of multimedia input sources (Step 202).

The auditing console processes and recognizes the required patterns as specified in the pattern database based on a marker in the multimedia content or in comparison with a sample multimedia content (Step 203). The multimedia content is recognized by the auditing console and a log for the same is stored in a database. According to an embodiment of the present invention, the auditing console communicates with the pattern database and prepares an audit report for the multimedia content.

The auditing console prepares a plurality of audit reports based on the different types of multimedia content received (Step 204). According to an embodiment of the present invention, the audit report comprises the log information such as frequency of playing a specific signature, a pattern of occurrence of the multimedia content, completeness of the specific signatures, location in which the multimedia is played and the like. Further, the audit report provides a frequency of display of an advertisement in a channel, number of channels broadcasting the same advertisement, display duration of the advertisement, and the like.

According to an embodiment herein, the plurality of media agencies analyzes the respective multimedia digital asset distribution details and queries the auditing console. The auditing console displays the audit report to the plurality of media agencies (Step 205). Based on the audit report, the media agency customizes the multimedia content delivery to the channels for increasing the revenue (Step 206). Further, the auditing console provides related information to the user through the mobile device. According to an embodiment herein, the related information include next multimedia content, previous multimedia content, number of times the multimedia is played, popularity of the played multimedia, user rating for the multimedia content, and the like.

Figure 3:
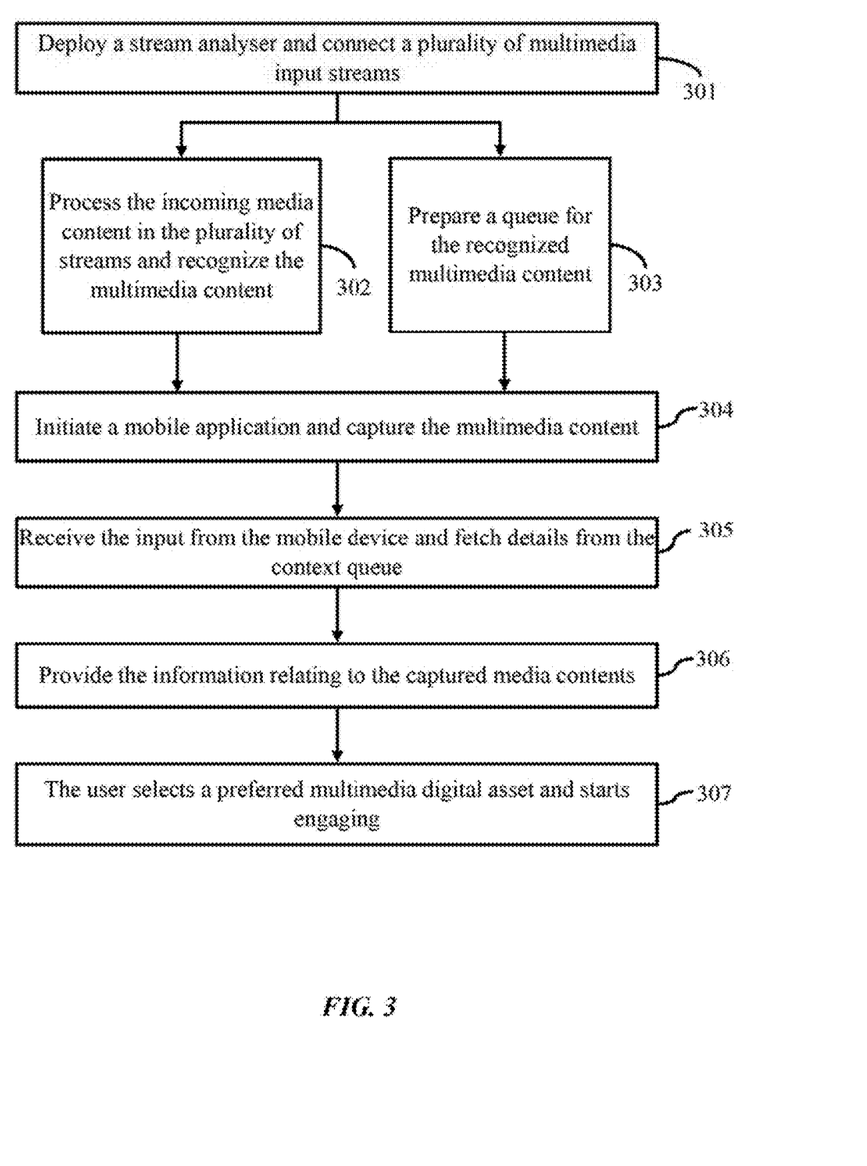
FIG. 3 illustrates a flow chart indicating a process for building a contextual cycle for a plurality of contexts of the multimedia content in various environments, according to an embodiment herein.

FIG. 3 illustrates a process flow diagram for building a contextual cycle for a plurality of contents in various environments, according to an embodiment herein. The method comprises deploying a stream analyzer and connecting to a channel such as a television, a digital signage, and the like. The stream analyzer is then provided with multiple streams of the multimedia input sources (Step 301). According to an embodiment herein, the output from the stream analyzer is then provided to the channel. The stream analyzer then processes multimedia content by continuously sampling the plurality of the multimedia content incoming from the plurality of multimedia input streams. The stream analyzer further recognizes the processed multimedia contents (Step 302). According to an embodiment herein, the stream analyzer further prepares a queue of the recognized multimedia content and stores the multimedia content in a context queue database (Step 303).

The user initiates a client application installed in the mobile device after watching a desired multimedia content on a channel and captures a multimedia content from the channel through the mobile device (Step 304). According to an embodiment herein, the multimedia recognition unit receives user input from the connected mobile device and initiates processing. The multimedia recognition unit fetches the queue from the stream analyzer and displays the queue either on the channel or on the mobile device itself (Step 305). The queue provides information relating to the media contents which are already been displayed on the channel (Step 306). The user selects a preferred multimedia content from the queue and starts engaging for further information (Step 307).

The embodiments herein provides a method and system for auditing and creating a report for the plurality of multimedia content displayed on a plurality of channels.

The embodiments herein further provides a method and system for creating a contextual cycle for a plurality of multimedia content displayed on indoor and outdoor environments.

Still further, the embodiments herein provides a method and system to display the history of the contexts within a given environment on user initiating the engagement.

The embodiments herein provides a system and method for determining a source of a multimedia media content being displayed on a channel.

The embodiments herein provides a method and system for interacting with the multimedia content through a mobile device on a real time basis.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented system for auditing a plurality multimedia contents, creating a contextual cycle of the plurality of multimedia contents, and associating the plurality of the multimedia content with a source, the system comprises:

a plurality of multimedia input sources configured for receiving a plurality of multimedia content, and wherein the plurality of the multimedia input sources include a plurality of streamed multimedia content sources and a plurality of non-streaming or stored multimedia content sources, and wherein the plurality of streamed multimedia content sources include internet, cable and satellite, and wherein the plurality of non-streaming or stored multimedia content sources include hard disk and webcasts;

an analysis and recognition module connected to the plurality of multimedia input sources and configured for analyzing and recognizing the plurality of the received multimedia contents, and wherein the analysis and recognition module comprises a stream analyzer, a multimedia recognition unit, a context queue database, and a pattern database, and wherein the stream analyzer is configured to directly processes and continuously sample the plurality of multimedia contents received from the plurality of multimedia input sources for building a contextual queue of the plurality of the multimedia content received from the plurality of multimedia input sources in the context queue database, and wherein the contextual queue is created for providing a related information about the recognized multimedia content, and wherein the related information include an index of the multimedia content, a previous sequence, a next sequence, and a location of origin of the multimedia content, and wherein the stream analyzer is configured to provide a related information to the plurality of users, and wherein the related information include the next sequence of the multimedia content, the previous sequence of the multimedia content, a user rating of the multimedia content, a popularity rating of the multimedia content, show timings of the multimedia content, and the location of the origin of the multimedia content, and wherein the multimedia recognition unit is configured for processing and recognizing a plurality of received multimedia contents captured by a plurality of mobile devices, and wherein the pattern database is configured for storing a plurality of patterns related to the plurality of the received multimedia contents, and wherein the plurality of patterns include a specific clip of the multimedia content, a marker associated with the clip, and a hidden marker associated with the clip; and an auditing console communicatively coupled with the analysis and recognition module, and wherein the auditing console is configured for monitoring the pattern database to generate an audit report.

2. The system according to claim 1, wherein the plurality of mobile devices is connected to a plurality of channels and wherein the plurality of mobile devices is loaded with a client application to enable a user to interact with a real time multimedia digital assets displayed on the channel to capture the plurality of multimedia contents and to engage with the plurality of multimedia content in real time, and wherein the plurality of the mobile devices is selected from a group consisting of mobile phones, smartphones, tablet computes, laptop computers, internet connectable devices, personal digital assistants (PDAs), and wearable devices.

3. The system according to claim 1, wherein the plurality of channels is configured for displaying the plurality of the multimedia contents through the mobile device, and wherein the plurality of channels is selected from a group consisting of a Television, Digital signage, hoardings, and wherein a multimedia content is displayed to a plurality of users.

4. The system according to claim 1, wherein the auditing console is configured to provide auditing solutions by processing and storing a log of the plurality of multimedia contents received from the plurality of multimedia input sources.

5. The system according to claim 1, wherein the multimedia recognition unit is configured to fetch an input from the plurality of users, and wherein the multimedia recognition unit is connected with the stream analyzer to provide a required information to the plurality of users.

6. The system according to claim 1, wherein the auditing console is configured to monitor a plurality of patterns based on the patterns stored in the pattern database to generate the audit report for enabling a plurality of media agencies to distribute a respective multimedia content across a plurality of channels.

7. The system according to claim 1, wherein the client application installed in the mobile device is run and configured to enable the plurality of users to recognize a channel in which the multimedia content is displayed.

8. The system according to claim 1, wherein the analysis and recognition module is configured to customize the plurality of multimedia contents delivered to the plurality of mobile devices based on the generated audit report.

9. A computer implemented method comprising instructions stored on a non-transitory computer readable storage medium and executed on a computing device for auditing multimedia digital assets, creating a contextual cycle of the multimedia assets and associating multimedia digital assets with a source corresponding to software program code files, the method comprising the steps of:

connecting a plurality of multimedia input sources to an analysis and recognizing module, and wherein the plurality of the multimedia input sources include a plurality of streamed multimedia content sources and a plurality of non-streaming or stored multimedia content sources, and wherein the plurality of streamed multimedia content sources include internet, cable and satellite, and wherein the plurality of non-streaming or stored multimedia content sources include hard disk and webcasts;

connecting an analysis and recognition module to the plurality of multimedia input sources for analyzing and recognizing the plurality of the received multimedia contents;

processing directly and sampling the plurality of multimedia contents received from the plurality of multimedia input sources continuously with a stream analyzer in the analysis and recognition module;

building a contextual queue of the plurality of the multimedia content received from the plurality of multimedia input sources in a context queue database with the stream analyzer, and wherein a contextual queue is created for providing a related information about the recognized multimedia content, and wherein the related information include an index of the multimedia content, a previous sequence, a next sequence, and a location of origin of the multimedia content;

providing related information to the plurality of users using a stream analyzer, wherein the related information include the next sequence of the multimedia content, the previous sequence of the multimedia content, a user rating of the multimedia content, a popularity of the multimedia content show timings of the multimedia content, and the location of the origin of the multimedia content;

processing and recognizing a plurality of received multimedia contents captured by a plurality of mobile devices with a multimedia recognition unit in the analysis and recognition module;

storing a plurality of patterns related to the plurality of the received multimedia contents in a pattern database, and wherein the plurality of patterns include a specific clip of the multimedia content, a marker associated with the clip, and a hidden marker associated with the clip;

communicatively coupling an auditing console with the analysis and recognition module for monitoring the pattern database to generate an audit report.

10. The method according to claim 9 further comprises:

connecting the plurality of mobile devices to a plurality of channels; and loading the plurality of mobile devices with a client application to enable a user to interact with a real time multimedia digital assets displayed on the channel to capture the plurality of multimedia contents and to engage with the plurality of multimedia content in real time, and wherein the plurality of the mobile devices is selected from a group consisting of mobile phones, smartphones, tablet computers, laptop computers, interact connectable devices, personal digital assistants (PDAs), and wearable devices.

11. The method according to claim 9 further comprises connecting the plurality of channels to the plurality of mobile devices for displaying the plurality of the multimedia content through the plurality of mobile devices, and wherein the plurality of channels is selected from a group consisting of a Television, Digital signage, hoardings, and wherein multimedia content is displayed to a plurality of users.

12. The method according to claim 9 further comprises processing and storing a log of the plurality of multimedia contents received from the plurality of multimedia input sources by the auditing console to provide auditing solutions.

13. The method according to claim 9 further comprises fetching an input from the plurality of users with the multimedia recognition unit, and wherein the multimedia recognition unit is connected with the stream analyzer to provide a required information to the plurality of users.

14. The method according to claim 9 further comprises monitoring a plurality of patterns based on the patterns stored in the pattern database with the auditing console to generates the audit report for enabling a plurality of media agencies to distribute a respective multimedia content across a plurality of channels.

15. The method according to claim 9 further comprises recognizing a channel, in which the multimedia content is displayed, with the client application installed in the mobile device.

16. The method according to claim 9 further comprises recognizing a source of the plurality of multimedia contents with a multimedia recognition unit, and wherein the plurality of the multimedia content is selected from a group consisting of audio, video, animation, image, text and a combination thereof.

17. The method according to claim 9 further comprises displaying the created contextual queue to the plurality of users through the plurality of mobile devices and customizing the plurality of multimedia content delivered to the plurality of mobile devices based on the generated audit report.

* * * * *